United States Patent

[11] 3,571,947

[72] Inventors William D. Maddison
Denville, N.J. 07834;
James J. De Lade, 195 C. Main St., Little
Falls, N.J. 07424
[21] Appl. No. 764,101
[22] Filed Oct. 1, 1968
[45] Patented Mar. 23, 1971

[54] MEANS FOR IDENTIFYING SKIN BLEMISHES
4 Claims, 6 Drawing Figs.
[52] U.S. Cl.................................................. 35/17,
35/50, 283/63
[51] Int. Cl.................................................. G09b 23/28
[50] Field of Search.......................................... 35/17, 50,
59; 128/2 (Cursory); 356/243, 244, 245; 32/17

[56] References Cited
UNITED STATES PATENTS
825,578 7/1906 Browne........................ 32/71X
1,709,066 4/1929 Field............................ 32/71

2,918,731 12/1959 Warhaftig et al............ 35/17X
FOREIGN PATENTS
584,980 11/1958 Italy............................ 35/59
OTHER REFERENCES
Clay-Adams Co. Catalog 105 for 1953 pp. 199, 201 only,
Class 35 library Primary Examiner—Harland S. Skogouist ABSTRACT: A flexible, compliant film of plastic on which is represented any one of a plurality of discrete skin blemishes. A handbook associated therewith illustrates all said discrete blemishes, identifies each by name, signifies the pathogenesis thereof, and prescribes theraputic prescriptions therefor. Each film-blemish and handbook illustration thereof is cross-indexed to effect identification of said film-blemish, said film being provided for laying upon the body, adjacent to a naturally subsisting skin blemish, to identify the latter and to determine the treatment therefor via reference to said handbook.

PATENTED MAR 23 1971 3,571,947

INVENTORS
WILLIAM D. MADDISON
JAMES J. DELADE
BY
Bernard J. Murphy
AGENT

MEANS FOR IDENTIFYING SKIN BLEMISHES

This invention pertains to means for identifying skin blemishes, toward identifying the pathogenesis thereof, and in particular to means usable by lay persons for identifying such blemishes, the pathogenesis thereof, and for determining the professionally prescribed treatment therefor.

In the prior art there are known means for determining the pathogenesis of illnesses and infections which involve "-slides," usable in a clinical laboratory by trained medical personnel, for identifying "smears " or bacteria, or the like. Typically, these "smears" or specimens require examination under a microscope by personnel skilled in identifications thereof. Clearly, the lay person cannot perform this type of analysis. The lay person must submit to ministrations of a medical practitioner to have the analysis done—and then, usually, he must wait a given period of time for the laboratory report to be conveyed to the practitioner, and finally interpreted and reported to himself. This rather involved procedure for arriving at a professional diagnosis is sometimes unavoidable; for some illnesses and infections, medical-laboratory analysis is the only practical procedure. However, most illnesses, infections, diseases, and the like, clearly manifest themselves in or on the body. Some constituent of the body; hand, chest, face, foot, etc., will signal the disability by a distinctive blemish, or a number of such blemishes which may only be a discoloration of the skin, or a growth—a prominence, or an erosion, or a broken, open, perhaps festering sore. But, here too lay persons are not qualified to do a self-diagnosis of their malaise. Here too, in these more frequently occurring circumstances, the lay person must either have a medical practitioner identify the blemish—and its pathogenis—and prescribe treatment, or he guesses and will "put something on it." Of course, the "-something" can be just the very improper thing, and cause a serious aggravation of the disability. Or worse, the self-determined, speculative treatment may just relieve the symptom—the blemish, nature's warning—of a serious illness which illness truly requires urgent medical treatment/attention.

Except perhaps in medical books, encyclopedias, and the like, the lay person has no ready access to means for identifying these natural warnings: skin growths, lesions, erosions, discolorations, etc. And even in having publications such as those noted available, the lay person is still met with two problems. For one, he cannot very readily identify a photo-offset color printing on a book page, of a growth, or sore, or the like, with that of the growth or sore which obtains on his forehead, or in the bend of his elbow, or on the joint of a toe. The print on a page somehow just does not quite correspond visually with the real blemish on the skin. As for the other problem, it is exceedingly difficult to position the color illustration on a given page in a bound book in adjacency to body locations whereat blemishes will occur.

Accordingly, what has long been needed is something more facile, which the lay person can use for positively identifying the fissure, wound, or whatever blemish he has, wherever it may subsist on his body, together with means for determining at least the professionally prescribed first aid type of therapy for the blemish— and its cause. Therefore, it is an object of our invention to teach means, usable by the layman, for identifying skin blemishes, toward identifying the pathogenesis thereof. Further, it is an object of our invention to teach means for use by lay persons for identifying skin blemishes and for determining at least the professionally prescribed first aid type of treatment for the blemish and its pathogenesis. A feature of our invention comprises a film of material on which is carried a representation of at least one blemish, said film being principally translucent, for laying upon the body in immediate adjacency to a naturally-subsisting blemish to enable a determination of correspondence therebetween. Another feature of our invention comprises a handbook within which are illustrated skin blemishes together with identifications thereof and prescriptions for therapy therefor.

Further objects and features of our invention will become more apparent by reference to the following description taken in conjunction with the accompanying FIGS., in which.

Figure 1:
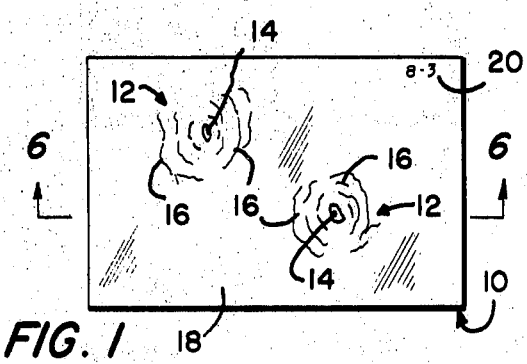
FIG. 1 is a plan view of the novel film, according to the invention, having a plurality of blemishes represented thereon.

As FIG. 1 illustrates, our novel film 10 has a plurality of blemishes 12 carried thereon. The blemishes 12 comprise cores 14 which simulate, for instance, the small open sores which proceed from a Poison Oak infection, or the like, and the peripheral "rings" 16 simulate the reddened skin which accompanies such an infection. The body 18 of film 10 is translucent except for the areas thereon comprising rings 16, cores 12, and areas therebetween have differing opacities. That is, film 10 is colorless save for the aforementioned areas, and said areas are colored to present optical images, i.e., representations, of natural blemishes. In our preferred embodiment, film 10 is formed of flexible, complaint plastic. The blemishes 12 are deposited thereon by multicolor imprinting techniques. Also, the films 10 have indexing indicia 20 in a corner thereof. The indicia 20 is for purposes subsequently explained herein.

Film 10, for being flexible and compliant, is readily disposed upon or about any member or constituent of the body. Thus, it is placed upon the body in immediate adjacency to whatever blemish it is that the body manifests. This facile use of the film 10, its use in immediate proximity to the bodily blemish, facilitates a ready recognition or correspondence between the blemish coloredly imaged on the film 10 and that subsisting on the body.

Figure 6:
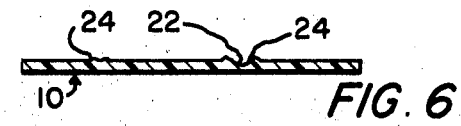
FIG. 6 is a longitudinal cross section of the film of FIG. 1 taken along section 6–6 of FIG. 1.

It is to be readily understood that the core 14, if representative of an open, festering wound, will have a discontinuous profile. Thus, as shown in FIG. 6, it will have relieved and raised surfaces 22 and 24, respectively, such surfaces being made by a deformation of the film 10 during preparation thereof. The deformation can proceed from heat treating, where the film 10 is plastic—as shown, by way of example in FIG. or from mechanical stamping means. The method of film preparation is not pertinent to the substance of the invention.

The teaching of our invention comprises the use of one or more such films 10 on which or in which representations of skin blemishes are formed. Accordingly, and further, the manner of color presentation is not pertinently germane to the invention. The color may be within or upon the film 10. Those skilled in the art of plastics, and the like, processing and printing, or forming and pigmentation, will appreciate one or more ways of preparing the films 10 of our invention.

Figure 2:
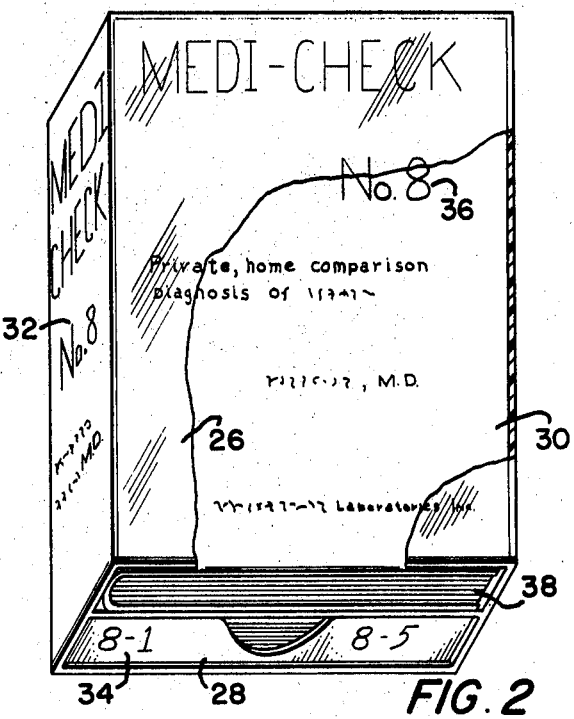
FIG. 2 is an isometric projection of a "marketable package" in which are found a plurality of films, per that of FIG. 1, the handbook, and a wraparound container for storage.

The package shown in FIG. 2 comprises a wraparound container 26 in which are confined an open-top container 28 and a handbook 30. The container 26 is shown partially broken away in order that the confinement of the handbook 30 therewithin may be seen. Container 26 stores together both the handbook 30, which illustrates, identifies, and prescribes any warranted first aid type of therapy for a given plurality of blemishes, and the films 10 which carry the representations of the blemishes which are comprised by the handbook 30. Accordingly, containers 26 and 28, and the handbook 30, have related indicia 32, 34, and 36, respectively.

Figure 3:
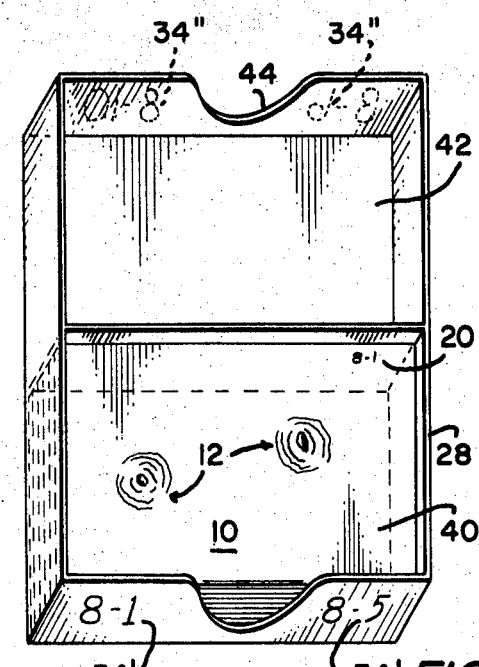
FIG. 3 is an isometric projection of the open container in which the plurality of films is storage-confined for future use and ready access.

Both the handbook 30 and the container 28 are removable from an open end 38 of container 26, and container 28, as shown in FIG. 3, comprises a two-compartment box. A first compartment 40 stores a first plurality of films 10, and a second compartment 42 stores a second plurality of films 10. Indicia 34' and 34" (corresponding to indicia 34 of FIG. 2, but "primed" here to distinguish between differing indicia series at either ends of container 28), carried on either ends of the container 28, match the indicia 20 carried by the film 10 provisioned for storage therewithin. By way of example, then, indicia 34' is shown as 8–1 and 8–5; films 10 provisioned for compartment 40, therefore, have indicia 20 carried thereon of 8–1 through 8–5. Container 28 has finger cutouts 44 formed therein, at the ends thereof, to facilitate the removal of the films 10. A plurality of films 10 are shown in compartment 40, while compartment 42 is illustrated as empty.

Figure 4:
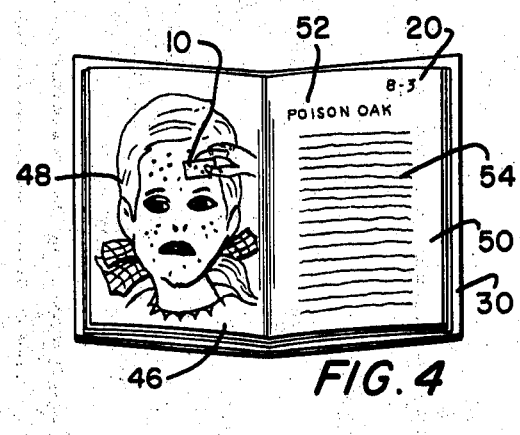
FIG. 4 is a perspective illustration of the handbook, said handbook being opened to a given reference page.

The handbook, according to our invention, and as shown in FIG. 4, has left-hand pages 46 with full-page illustrations of the body constituents, for instance: a child's face 48, with infection caused blemishes thereon, and a right-hand page 50 of text, associated with the facing illustration; i.e., a text page for each illustration page. On the child's face, by way of example, are color-illustrated the distinctive blemishes caused by a given infection, or the like. The corresponding right-hand page 50 carries discrete indicia 20 which matches one of the discrete indicia 20 on compartment 40 or 42 films 10. The match of indicia 20 on a film 10 with that on a given page 50 provides a means of identifying the name of the blemish and the pathogenesis thereof. This is so because each text presentation has a title 52 naming the blemish, naming the pathogenesis thereof, or both—and it will be recognized that frequently the "title" is given for both. That is to say: in common parlance, the sores which proceed from Poison Oak, for instance, are called Poison Oak. Actually, they are in fact the infections which are caused by the pathogenesis: Poison Oak. So, where popularly both the cause and effect are given the same name, title 52 is so noted. Where there is a distinction therebetween, title 52 will note the name of the one or the other—whichever is more familiar to the lay public.

As medical therapy is neither the purpose of this specification, nor within the competence of the inventors, the text 54 of right-hand page 50 is but symbolically represented. It is to be clearly understood, however, that the teaching of our invention is the provisioning, on right-hand page 50, within the text 54, of a brief exposition of the accompanying symptoms of the pertinent disability. Thus, if the skin blemishes for a particular malaise is accompanied with fever, or chills, or nausea, or whatever, this is textually noted. If the nature of the malaise is such as requires immediate or subsequent physician's attendance, this is noted. If an immediate home-administered first aid type of therapy is warranted, the nature and medicants thereof and therefor are presented. If only home-administered therapy is necessary, the prescriptive text 54 will set forth the manner and frequency of applications of medicants, ointments, etc., and will identify such medicants by generic or trade names to facilitate the purchase thereof.

The kinds of infections, illnesses, and the like, can be arbitrarily grouped. Thus, there are the environmentally-induced infections: Poison Oak, Ivy, and so on, which can comprise a group which may be of interest to particular lay persons—prospective campers, for instance. There are the more communicable infections: Measles, Chicken Pox, and the like, which is a grouping perhaps of more interest to parents. There are other blemishes which lend themselves to a generic grouping: boils, warts, corns, fever blisters, etc. There are also the blemishes which signal the contraction of venereal diseases. Therefore, our invention comprises the setting forth of individual handbooks 30 and pluralities of films 10 for accompaniment therewith, for each of the generic groupings of malaise.

Each package, according to FIG. 2, then, comprises such a grouping. As the groupings are arbitrarily determined, the number of "packages" which might complete a home medical library is not fixed. For illustrative purposes, however, in FIG. 5 we have represented a plurality of eight such packages.

Figure 5:
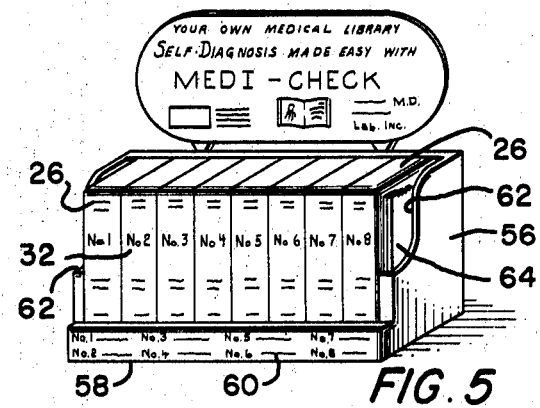
FIG. 5 is a display rack, for merchandising purposes, in which a plurality of the packages of FIG. 2 are shown.

As shown in FIG. 5, eight containers 26 are arranged in a display rack 56 as such a rack might be exposed in a retail store. The rack 56 has an open front in order that the indicia 32 might be viewed. Across the base 58 of the rack 56 is a printed panel 60 on which is noted both the indicia 32, for each of the packages (i.e., containers 26), and brief textual indications therewith of the generic grouping of malaise comprised by the packages so marked. If a prospective customer wishes to locate the package which groups Measles, Chicken Pox, and the like, he can determine this from reading panel 60.

At either end of the rack 56 are relieved pockets 62. These pockets 62 store therein bags or sacks 64 which have imprinted thereon the trade mark of the merchandise (i.e., the packages) and the price. It is proposed that no further printing be included thereon. The reason for provisioning sacks 64, in this manner, is to permit purchasers to procure a given package—of whatever malaise-subject-grouping—and conceal it, without disclosing to the clerk, or to other customers at the register counter, just what grouping is of concern to him.

As our preferred embodiment, we present films 10 for laying upon the body, in immediate adjacency to the naturally subsisting blemish. Of course, other embodiments will occur to those skilled in the art to which our invention pertains, which fully and wholly fall within the spirit of our teaching. For instance, in an alternate embodiment, films similar to films 10 can be carried in a light box for projection of the blemish image on the body—again adjacent to the natural blemish. Thus, our teaching broadly comprehends the provisioning of means for presenting representations of natural skin blemishes on corporal constituents. And, while we have set forth our invention in connection with a specific embodiment thereof, it is to be clearly understood that this is done only by way of example, and not as a limitation to the scope of our invention as set forth in the objects thereof and in the accompanying claims.

We claim:

1. Toward identifying the pathogeneses thereof, means for identifying skin blemishes, comprising:
   film means for presenting representations of said blemishes on body constituents;
   said film means having means carried thereby representative of at least one of said blemishes; wherein said film means comprises a film of compliant material;
   said representative means comprises a localized, colored simulation of said one blemish, said simulation comprising discontinuities in a surface of said film;
   means providing at least nominative identification of each blemish in a plurality of said blemishes;
   said identification means having first indexing means for distinguishing as between identifications; wherein said film means further has second indexing means which is in correspondence with said first indexing means; and
   said identification means comprising a reference handbook, said handbook having illustrations therein pictorially representative of said blemishes as the same are known to be manifest on body constituents, and having textual descriptions of any symptoms which are known to accompany the occurrence of such blemishes, and at least any warranted first aid type of prescriptions for theraputic treatment of said blemishes and the pathogeneses thereof; and wherein said indexing means comprises indexing indicia, carried by said handbook and said film, to signal a correspondence between said blemish carried by said film and said descriptions and prescriptions.

2. Identifying means, according to claim 1, wherein: said film means has areas of translucency and areas of differing opacities.

3. Identifying means, according to claim 1, wherein: said film means has areas of translucency and areas of optical imagery.

4. Identifying means, according to claim 1, wherein: said representative means is multicolored.